United States Patent [19]
Matsuura et al.

[11] Patent Number: 5,906,704
[45] Date of Patent: May 25, 1999

[54] HOT-MELT RESIN COMPOSITION, PRODUCTION OF POWDER FORM THEREOF, AND HOT-MELT RESIN POWDER COMPOSITION

[75] Inventors: Kazushige Matsuura; Akira Iwasaki; Hideki Ohmori, all of Kyoto, Japan

[73] Assignee: Sanyo Chemical Industries, Ltd., Kyoto, Japan

[21] Appl. No.: 08/937,463

[22] Filed: Sep. 25, 1997

[30] Foreign Application Priority Data

Sep. 25, 1996 [JP] Japan ................................. 8-275429
Apr. 28, 1997 [JP] Japan ................................. 9-124793
Jun. 9, 1997 [JP] Japan ................................. 9-168014

[51] Int. Cl.$^6$ .................... C09J 175/04; C08G 18/40; C08G 18/66; C08K 5/205
[52] U.S. Cl. ..................... 156/331.4; 156/331.7; 156/DIG. 36; 528/59; 528/60; 528/69
[58] Field of Search ............... 156/331.4, 331.7, 156/DIG. 36; 528/59, 60, 69

[56] References Cited

U.S. PATENT DOCUMENTS

| | | |
|---|---|---|
| 3,715,326 | 2/1973 | Traubel et al. . |
| 4,036,797 | 7/1977 | Meader, Jr. . |
| 4,242,488 | 12/1980 | Stanley et al. .................. 428/423.1 |
| 4,352,858 | 10/1982 | Stanley .......................... 428/423.1 |
| 5,210,127 | 5/1993 | Werner et al. ................... 524/589 |
| 5,525,654 | 6/1996 | Podola et al. .................... 524/199 |

FOREIGN PATENT DOCUMENTS

| | | |
|---|---|---|
| 0 248 658 A2 | 12/1987 | European Pat. Off. . |
| 0 289 901 A2 | 11/1988 | European Pat. Off. . |
| 55-110173 | 8/1980 | Japan . |
| 63-15930 | 4/1988 | Japan . |
| 2-38453 | 2/1990 | Japan . |
| 3-97712 | 4/1991 | Japan . |
| 5-170927 | 7/1993 | Japan . |
| 5-230163 | 9/1993 | Japan . |
| WO 92/08134 | 5/1992 | WIPO . |

*Primary Examiner*—Nathan M. Nutter
*Attorney, Agent, or Firm*—Pollock, Vande Sande & Amernick

[57] ABSTRACT

The present invention provides a hot-melt resin composition which comprises 1 to 30% by weight of a compound represented by the general formula (1)

$$Q\text{-}(X\text{-}A)n \tag{1}$$

(wherein X is a urethane or urea group, Q is a group with a valence of n, A is a univalent group, one of Q and A being an isocyanate residue and the other being an amine or alcohol residue, and n is an integer of 1 to 3) and 70 to 99% by weight of a thermoplastic polyurethane resin (B); a method of producing a powder form of said hot-melt resin composition; and a hot-melt resin powder composition which comprises said powder-form hot-melt resin composition.

20 Claims, No Drawings

HOT-MELT RESIN COMPOSITION, PRODUCTION OF POWDER FORM THEREOF, AND HOT-MELT RESIN POWDER COMPOSITION

FIELD OF THE INVENTION

The present invention relates to a hot-melting property improving agent and a hot-melt resin composition. More particularly, it relates to a hot-melt resin composition which, particularly when used as an adhesive for interlining, shows good flexibility, adhesiveness, resistance to dry cleaning and resistance to laundering, among others, and when used as a slush molding material, gives molded sheets with good smoothness, flexibility, antifogging property, and resin strength, among others.

BACKGROUND ART

Hot-melt adhesives recently employed for rationalization of sewing works have indeed radically rationalized sewing works and are currently in wide use. The hot-melt adhesives so far in use include polyethylene-based, polyamide-based, plasticized polyvinyl chloride-based, polyvinyl acetate-based and polyester-based ones, among others. However, they respectively have problems. Thus, ① polyethylene-based adhesives are unsatisfactory in bonding strength, feeling, and resistance to dry cleaning; ② polyamide-based adhesives are sufficient in bonding strength and resistance to dry cleaning but unsatisfactory in feeling and resistance to laundering; ③ plasticized polyvinyl chloride-based adhesives are sufficient in feeling and resistance to laundering but unsatisfactory in resistance to dry cleaning, and they have other problems in that they are subject to changes in bonding performance, feeling and other properties with the lapse of time due to migration of plasticizer during storage of interlining cloths; ④ polyvinyl acetate-based adhesives are satisfactory in feeling but insufficient in resistance to laundering and to dry cleaning; and ⑤ polyester-based adhesives are satisfactory in bonding strength and resistance to laundering but insufficient in resistance to dry cleaning.

To overcome the above problems, a hot-melt adhesive comprising a thermoplastic polyurethane resin powder has been proposed (Japanese Kokoku Publication Sho-63-15930; Japanese Kokai Publication Sho-55-110173). However, this polyurethane resin powder-based adhesive has problems in that it is insufficient in hot-melt property, hence its bonding property cannot be improved to a satisfactory extent.

On the other hand, the slush molding technique has recently acquired wide popularity in the manufacture of automotive upholstery, among others, since products complicated in shape and form (undercuts, deep formings, etc.) can be molded with ease and uniform thicknesses and good yields can be obtained by this technique. Plasticized polyvinyl chloride (hereinafter briefly referred to as PVC) powders are mainly used in such applications.

However, because any plasticized PVC contains a low molecular weight plasticizer in a large proportion, it tends to cause various problems due to aging, e.g. fogging of the windshield of a car due to formation of an oil film interfering with the driver's vision by volatilization of the plasticizer, loss of matting and a soft feel of shaped articles due to migration of the plasticizer to the surface, and yellowing of the articles due to degradation of the PVC with time.

Modified PVC compositions prepared by incorporating a flexible thermoplastic polyurethane resin are known as materials for providing a soft feel without using any low-molecular plasticizer (e.g. Japanese Kokoku Publication Sho-53-29705, Sho-59-39464 and Sho-60-30688). In each modification, however, the base resin is PVC and therefore the problem of degradation of articles with time has not been resolved as yet. Attempts have been made to improve such problems and obtain products with desired physical properties by using polyurethane resins alone (e.g. Japanese Kokai Publication Hei-02-38453 and Hei-03-97712). However, the resin powders used therein have poor hot-melting properties, hence can hardly give molded sheets with good surface smoothness, rendering it difficult to use it in slush molding.

Accordingly, it is an object of the present invention to provide a hot-melt resin composition which shows good (sharp) hot-melting property and which, when used as an adhesive for interlining, shows good adhesiveness, flexibility (feel), resistance to laundering and resistance to dry cleaning and, when used as a slush molding material, gives molded sheets with good smoothness, flexibility, antifogging property and resin strength and to provide a hot-melting property improving agent to be used in said composition.

SUMMARY OF THE INVENTION

Intensive investigations made by the present inventors to solve the above problems have now led to completion of the present invention.

The present invention thus provides a hot-melt resin composition which comprises 1 to 30% by weight of a compound (A) represented by the general formula (1)

$$Q\text{-}(X\text{-}A)n \qquad (1)$$

(wherein X is a urethane or urea group, Q is a group with a valence of n, A is a univalent group, one of Q and A being an organic isocyanate residue and the other being an amine or alcohol residue, and n is an integer of 1 to 3) and 70 to 99% by weight of a thermoplastic polyurethane resin (B); a method of producing a powder form of said hot-melt resin composition; and a hot-melt resin powder composition which comprises said powder form of hot-melt resin composition.

DETAILED DESCRIPTION OF THE INVENTION

The thermoplastic polyurethane resin (B) to be used in the practice of the present invention can be prepared, for example, by reacting an organic polyisocyanate (a1) with a high-molecular weight polyol (a2), as necessary together with a low-molecular weight polyol (a3) in proportions such that the NCO group to OH group equivalent ratio [NCO/OH] is generally 1.01 to 4.0, preferably 1.3 to 3.0 to give an isocyanate-terminated urethane prepolymer (B1) and then reacting said prepolymer (B1) with water and/or a chain extender (B2), when necessary together with a terminator (B3).

The organic polyisocyanate (a1) to serve as a constituent of (B1) includes aliphatic polyisocyanates containing 2 to 12 carbon atoms (exclusive of the NCO-forming carbon atoms) [e.g. ethylene diisocyanate, tetramethylene diisocyanate, hexamethylene diisocyanate, dodecamethylene diisocyanate, 2,2,4-trimethylhexanediisocyanate, lysine diisocyanate, 2,6-diisocyanatomethyl caproate, etc.]; alicyclic polyisocyanates containing 4 to 15 carbon atoms (exclusive of the NCO-forming carbon atoms) [e.g. isophoronediisocyanate, dicyclohexylmethanediisocyanate, cyclohexylenediisocyanate, methylcyclohexylene diisocyanate, etc.]; araliphatic diisocyanates containing 8 to 12 carbon atoms (exclusive of the NCO-forming carbon atoms) [e.g. xylylene diisocyanate, α,α,α',α'-tetramethylxylylene diisocyanate, etc.]; aromatic diisocyanates [e.g. tolylene diisocyanate, diethylbenzenediisocyanate, diphenylmethanediisocyanate, naphthylene diisocyanate, etc.]; modifications of these diisocyanates (e.g. modifications containing carbodiimide, urethdione, isocyanurate, biuret or like groups); and combinations of two or more of these.

Preferred among those mentioned above as examples of (a1) are aliphatic diisocyanates and alicyclic diisocyanates and particularly preferred are hexamethylene diisocyanate (hereinafter briefly referred to as HDI), isophoronediisocyanate (hereinafter briefly referred to as IPDI) and dicyclohexylmethanediisocyanate.

The high-molecular weight polyol (a2) to serve as a constituent of (B1) includes polyether polyols, polyester polyols, polyetherester polyols, polysiloxaneglycols, polybutadiene glycols, acrylic polyols, polymer polyols (polyols produced by polymerizing a vinyl monomer in a high-molecular weight polyol), and mixtures of two or more of these.

Said polyol (a2) generally has a number-average molecular weight of 500 to 5,000, preferably 700 to 3,000.

Said polyether polyols include ① compounds produced by addition of an alkylene oxide containing at least 3 carbon atoms to a compound having two or three (preferably two) active hydrogen-containing groups (e.g. low-molecular weight polyols, polyhydric phenols, etc.); ② products of ring opening polymerization of tetrahydrofuran; and mixtures of two or more of these.

Usable as said low-molecular weight polyols are those polyols mentioned later herein as starting materials for preparing polyester polyols. As said polyhydric phenols, there may be mentioned bisphenols (bisphenol A, bisphenol S, etc.) and dihydroxybenzenes (catechol, hydroquinone, etc.). Preferred among these are aliphatic or alicyclic low-molecular weight polyols.

As said alkylene oxide containing at least 3 carbon atoms, there may be mentioned propylene oxide (hereinafter briefly referred to as PO), 1,2-, 1,3-, 1,4- or 2,3-butylene oxide, styrene oxide, and combinations of two or more of these (in the case of block or random addition). Among these, PO is preferred.

The polyester polyols include, among others, ① condensation polyester polyols resulting from polycondensation of a low-molecular weight polyol with a dicarboxylic acid or a polyester-forming derivative thereof, ② polylactone polyols resulting from ring opening polymerization of a lactone in the presence of a low-molecular weight polyol as a starting material, ③ polyester polylactone polyols resulting from ring opening polymerization of a lactone in the presence of a condensation polyester, ④ polycarbonate polyols resulting from condensation polymerization of a low-molecular weight polyol with ethylene carbonate or the like; and mixtures of two or more of these.

The low-molecular weight polyol for preparing the polyester polyols ①, ② or ④ mentioned above includes, among others, aliphatic diols [ethylene glycol, diethylene glycol, propylene glycol, 1,4-butanediol, 1,6-hexanediol, neopentyl glycol, 1,2-alkanediols containing 4 to 24 carbon atoms (dodecane-1,2-diol etc.), etc.]; diols containing a cyclic group [1,4-bis(hydroxymethyl)cyclohexane, m- or p-xylylene glycol, alkylene oxide adducts of bisphenols, etc.] and combinations of two or more of these.

An alcohol which is at least trihydric (trimethylolpropane, glycerol, etc.) may be used in combination with said low-molecular weight polyol. In cases where such alcohol is used, it is used in an amount of not more than 5 mole percent relative to said low-molecular weight polyol.

As examples of said dicarboxylic acid or ester-forming derivative thereof to be used in preparing the polyester polyols ① mentioned above, there may be mentioned aliphatic dicarboxylic acids (succinic acid, adipic acid, sebacic acid, glutaric acid, azelaic acid, maleic acid, fumaric acid, etc.), aromatic dicarboxylic acids (terephthalic acid, isophthalic acid, etc.), lower (1 to 4 of carbon atoms) alkyl esters of these, and combinations of two or more of these.

The lactone to be used in preparing the polyols ② or ③ mentioned above includes γ-butyrolactone, ε-caprolactone, γ-valerolactone, and combinations of two or more of these.

Preferred among the high-molecular weight polyols (a2) mentioned above are polyester polyols, and more preferred are condensation polyester polyols resulting from condensation polymerization of a low-molecular weight polyol and a dicarboxylic acid or an ester-forming derivative thereof, as well as polycarbonate polyols.

As specific examples of said condensation polyester polyols, there may be mentioned polyneopentyl adipate diol, polyethylene adipate diol, polyethylene-butylene adipate diol, polybutylene-hexylene adipate diol, polydiethylene glycol isophthalate diol, polycarbonate diol and the like. As specific examples of the polycarbonate polyols, there may be mentioned, polyhexamethylene carbonate diol and the like.

The low-molecular weight polyol (a3) to be used as a constituent of (B1) as necessary includes, among others, aliphatic low-molecular weight diols [ethylene glycol, diethylene glycol, propylene glycol, 1,4-butanediol, etc.]; low-molecular weight diols containing a cyclic group [e.g. those described in Japanese Kokoku Publication Sho-45-1474; 1,4-bis(hydroxymethyl)cyclohexane, m- or p-xylylene glycol, etc.]; alkylene oxide (the number of moles being small) adducts of bisphenols (molecular weight being not more than 500); and combinations of two or more of these.

The isocyanate-terminated urethane prepolymer (B1) derived from (a1) and (a2), as necessary together with (a3) generally has a free isocyanate content of 2 to 12% by weight, preferably 2 to 8% by weight.

The chain extender (B2) includes, among others, amines such as polyamines and polyamide polyamines, and ketimine compounds derived from these. Also usable are amine-based polyols (e.g. alkylene oxide adducts of polyamines) and the above-mentioned low-molecular weight polyols (a3). Preferred among these are amines and ketimines derived therefrom. Amines having at least two primary amino groups within each molecule thereof and ketimines derived therefrom are more preferred.

Said polyamines include aromatic diamines [diethyltoluenediamine, 2,4- or 2,6-dimethylthiotoluenediamine, etc.], alicyclic diamines [isophoronediamine (hereinafter briefly referred to as IPDA), 4,4'-diaminodicyclohexylmethane, 4,4'-diamino-3,3'-dimethyldicyclohexyl-methane, diaminocyclohexane, etc.], aliphatic diamines [ethylenediamine, 1,6-hexamethylenediamine, etc.], triamines [diethylenetriamine etc.] and mixtures of two or more of these.

As said polyamide polyamines, there may be mentioned, for example, condensation reaction products from a dimer acid (polymerized fatty acid) and a stoichiometric excess of diethylenetriamine.

As said ketimine compounds, there may be mentioned those ketimine compounds which are reaction products from said polyamines and ketones (acetone, methyl ethyl ketone, methyl isobutyl ketone, etc.).

Among the above-mentioned examples of chain extender (B2), preferred are aliphatic diamines, alicyclic diamines, and ketimine compounds derived from these diamines.

The chain extender (B2) is generally used in an amount of 0.5 to 1.5 equivalents, preferably 0.7 to 1.2 equivalents, per equivalent of free isocyanate group in the urethane prepolymer (B1). Outside this range, the resulting composition, when used as an adhesive for interlining cloths, will fail to provide a satisfactory bonding strength and, when used as a slush molding material, will fail to provide molded sheets with a sufficient resin strength.

The terminator (B3) to be used as necessary for molecular weight adjustment together with the chain extender (B2) includes monohydric alcohols [methanol, ethanol, n-butanol, cellosolve, alkylene oxide adducts of these, and alkylene oxide adducts of phenols, etc.], alkylamines [ethylamine, butylamine, diethylamine, dibutylamine, etc.] and alkanolamines [monoethanolamine, dipropanolamine, diethanolamine, etc.]. Among these, alkylamines and alkanolamines are preferred. Said terminator (B3) is generally used in an amount of not more than 0.5 equivalent, preferably not more than 0.3 equivalent, per equivalent of free isocyanate group in the urethane prepolymer (B1). Amounts exceeding 0.5 equivalent are unfavorable since the resulting composition, when used as an adhesive for interlining, gives a decreased bonding strength and, when used as a slush molding material, provides molded sheets with a decreased resin strength.

In producing the thermoplastic polyurethane resin (B), a known catalyst may be used as necessary. As specific examples of said catalyst, there may be mentioned organometallic compounds [dibutyltin dilaurate, dioctyltin laurate, etc.]; amines [triethylamine, triethylenediamine, diazabicycloundece ne, etc.]; and combinations of two or more of these. The addition level is not critical but generally is within the range of 0.001 to 0.05 part by weight per 100 parts by weight of the thermoplastic polyurethane resin (B).

In producing the thermoplastic polyurethane resin (B), a known solvent (dimethylformamide, toluene, methyl ethyl ketone, ethyl acetate or the like) may be used as necessary.

The method of producing the thermoplastic polyurethane resin (B) includes, but is not limited to the following methods ① to ④.

① A method which comprises subjecting to polymerization the organic polyisocyanate (a1), polyol (a2) and chain extender (B2), as necessary together with the low-molecular weight polyol (a3) and terminator (B3) collectively either without using any solvent or in the presence of a solvent.

② A method which comprises reacting (a1) and (a2), as necessary together with (a3), either without using any solvent or in the presence of a solvent, to give the isocyanate-terminated urethane prepolymer (B1) and reacting said prepolymer (B1) with (B2), as necessary together with (B3), either without using any solvent or in the presence of a solvent.

③ A method which comprises dispersing the urethane prepolymer (B1) obtained in the absence or presence of the solvent in water containing a dispersion stabilizer (D) and reacting (B1) with water and/or the chain extender (B2), as necessary together with the terminator (B3).

④ A method which comprises dispersing the urethane prepolymer (B1) obtained in the absence or presence of the solvent in a non-aqueous dispersion medium (hexane, heptane, etc.) containing a dispersion stabilizer (D) and reacting (B1) with (B2), as necessary together with (B3).

Among these, the method ③ is the most preferred production method.

In the practice of the present invention, the thermoplastic polyurethane resin (B) is generally used in the form of a powder or an aqueous paste. As regards a method of preparing the powder or aqueous paste, freezing and grinding can give the powder when the polymerization is carried out by the above method ① or ② in a solvent-free system whereas spray drying can give the powder in cases where the polymerization is carried out by the method ① or ② in a solvent system. When the dispersion polymerization is carried out in water containing the dispersion stabilizer (D) according to the above-mentioned method ③, separation, for example by filtration or centrifugation, followed by drying gives the powder and addition of a thickener to the dispersion obtained after completion of the polymerization gives the aqueous paste. When the polymerization reaction is carried out in a non-aqueous dispersion medium containing the dispersion stabilizer (D) according to the above method ④, separation by filtration, for instance, and the subsequent drying give the powder.

The dispersion stabilizer (D) to be used in the above-mentioned method ③ is preferably one which is insoluble or soluble in water but will not emulsify (B).

The water-insoluble dispersion stabilizer (D1) includes those compounds which contain within each molecule thereof a moiety having affinity for the thermoplastic polyurethane resin (B) and a hydrophilic moiety, with the moiety having such affinity and the hydrophilic moiety being bonded together via an ester or urethane bond (preferably a urethane bond). Preferred examples are polybutylene adipate (number average molecular weight=1,000)/HDI/ polyethylene glycol (number average molecular weight=2, 000) [1/1/1 in mole ratio] reaction products, polypropylene glycol (number average molecular weight=1,000)/IPDI/ polyethylene glycol (number average molecular weight=2, 000) [1/1/1 in mole ratio] reaction products and the like.

As the water-soluble dispersion stabilizer (D2), there may be mentioned water-soluble cellulose derivative resins such as methylcellulose, hydroxyethylcellulose, hydroxypropylmethylcellulose, carboxymethylcellulose, polyvinyl alcohol, polyacrylic acid salts, polyethylene glycol, polyvinylpyrrolidone, polyacrylamide, normal salts of phosphoric acid and the like. Among these, polyvinyl alcohol is preferred.

The dispersion stabilizer (D) is generally used in an amount of 0.1 to 5 parts by weight, preferably 0.2 to 3 parts by weight, per 100 parts by weight of the thermoplastic polyurethane resin (B).

The thermoplastic polyurethane resin (B) generally has a number average molecular weight of 5,000 to 80,000, preferably 10,000 to 50,000, as determined by GPC.

The compound (A), which is to be used in the practice of the present invention and has the general formula $$Q\text{-}(X\text{-}A)n \tag{1}$$

(wherein X is a urethane or urea group, Q is a group with a valence of n, A is a univalent group, one of Q and A being an isocyanate residue and the other being an amine or alcohol residue, and n is an integer of 1 to 3), serves as a component for improving (rendering sharp) the hot-melting property of the thermoplastic polyurethane resin (B).

When, in the above general formula (1), Q is an isocyanate residue, X is —NHCOO— or —NHCONH— and when A is an isocyanate residue, X is —OOCNH— or —NHCONH—.

The compound (A) of general formula (1) is the reaction product obtained by reacting an organic monoisocyanate with an equivalent amount of a monohydric alcohol and/or a monoamine, reacting an organic monoisocyanate with an equivalent amount of a di- or trihydric alcohol and/or a di- or triamine, or reacting a bi- or trifunctional organic polyisocyanate with an equivalent amount of a monohydric alcohol and/or a monoamine.

Said organic monoisocyanate includes aliphatic monoisocyanates containing 1 to 22 carbon atoms (exclusive of the NCO-forming carbon atom) (methyl isocyanate, ethyl isocyanate, butyl isocyanate, lauryl isocyanate, stearyl isocyanate, oleyl isocyanate, behenyl isocyanate, etc.); alicyclic monoisocyanates containing 4 to 15 carbon atoms (exclusive of the NCO-forming carbon atom) (cyclohexyl isocyanate, methylcyclohexyl isocyanate, etc.); araliphatic monoisocyanates containing 8 to 12 carbon atoms (exclusive of the NCO-forming carbon atom) (benzyl isocyanate, phenethyl isocyanate, etc.); aromatic monoisocyanates (phenyl isocyanate, tolyl isocyanate, xylyl isocyanate, naphthyl isocyanate, etc.); and combinations of two or more of these.

As the bi- or trifunctional organic polyisocyanate mentioned above, there may be mentioned those organic polyisocyanates given hereinabove as examples of (a1).

Preferred among these examples of the organic mono- or polyisocyanate are aliphatic monoisocyanates, aliphatic diisocyanates, alicyclic diisocyanates, biuret modifications of aliphatic diisocyanates, and isocyanurate modifications of alicyclic diisocyanates. Particularly preferred are stearyl isocyanate, HDI, IPDI and dicyclohexylmethanediisocyanate.

As the amine to be used in preparing the compound (A), there may be mentioned those bi- or trifunctional amines mentioned above as examples of the chain extender (B2) as well as bi- or trifunctional alkanolamines and mono- or dialkylamines containing 2 to 18 carbon atoms in alkyl moiety.

As the alcohol to be used in preparing the compound (A), there may be mentioned those low-molecular weight polyols (a3) mentioned above as examples of the starting materials for preparing the thermoplastic polyurethane resin (B) and those monohydric alcohols given above as examples of the terminator (B3).

The compound (A) can be prepared by reacting the organic mono- and/or polyisocyanate with the mono- or polyalcohol and/or mono- or polyamine in a conventional manner.

Said compound (A) generally has a number average molecular weight of 200 to 2,000, preferably 300 to 1,500. When the number average molecular weight is outside the above range, the resulting composition, when used as an adhesive for interlining, cannot give a good bonding strength and, when used as a slush molding material, cannot provide molded sheets with surface smoothness.

Said compound (A) generally shows a melting initiation temperature of 10° C. to 180° C. , preferably 50° C. to 150° C., with a difference between the melting initiation temperature and melting completion temperature of not more than 10° C., preferably not more than 8° C . When said compound (A) has a melting initiation temperature below 10° C., the heat softening point of the resin composition comprising (A) and the thermoplastic polyurethane resin (B) becomes excessively low, causing the problem of coalescence of resin particles at ordinary temperature. When said temperature is higher than 180° C., the hot-melt property improving effect will not be produced any longer. When the difference between the melting initiation temperature and melting completion temperature exceeds 10° C., the hot-melt property improving effect becomes poor.

In the practice of the present invention, the melting initiation temperature and melting completion temperature can be determined by the method (TMA) described in JIS K 7196 (1991).

As preferred specific examples of said compound (A), there may be mentioned the stearyl isocyanate/benzyl alcohol (1/1 in mole ratio) reaction product, stearyl isocyanate/stearylamine (1/1 in mole ratio) reaction product, stearyl isocyanate/distearylamine (1/1 in mole ratio) reaction product, stearyl isocyanate/1,6-hexamethylenediamine (2/1 in mole ratio) reaction product, stearyl isocyanate/isophoronediamine (2/1 in mole ratio) reaction product, HDI/n-butylamine (1/2 in mole ratio) reaction product, IPDI/di-n-butylamine (1/2 in mole ratio) reaction product, IPDI/benzyl alcohol (1/2 in mole ratio) reaction product, biuret-modified HDI trimer/stearylamine (1/3 in mole ratio) reaction product, biuret-modified HDI trimer/distearyl amine (1/3 in mole ratio) reaction product, isocyanurate-modified IPDI trimer/stearylamine (1/3 in mole ratio) reaction product, isocyanurate-modified IPDI trimer/n-butyl alcohol (1/3 in mole ratio) reaction product, and the like.

In the hot-melt resin composition of the present invention, the weight ratio between the thermoplastic polyurethane resin (B) and compound (A) is generally (70 to 99):(30 to 1), preferably (80 to 95):(20 to 5). When the proportion of (A) exceeds 30, the resulting composition, when used as an adhesive for interlining, will show decreased resistance to dry cleaning and, when used as a slush molding material, will provide molded sheets with a decreased resin strength. On the other hand, when the proportion of (A) is smaller than 1, the hot-melt properties cannot be improved and the resulting composition, when used as an adhesive for interlining, will fail to show sufficient adhesiveness and, when used as a slush molding material, will fail to provide molded sheets with sufficient smoothness.

The hot-melt resin composition of the present invention can be prepared, for example, by ① a method comprising incorporating the compound (A) into one of the urethane prepolymer (B1), chain extender (B2) and terminator (B3), dispersing the components in water containing the dispersion stabilizer (D) using a high-speed dispersion mixer and allowing the reaction to proceed generally at 5° C. to 60° C., preferably 10° C. to 50° C., to give a composite resin dispersion, as necessary followed by removing the water; ② a method comprising uniformly mixing together the thermoplastic polyurethane resin (B) and compound (A) in molten state and freezing and grinding the resulting resin mixture to give a powder; or ③ a method comprising uniformly mixing pulverized (A) with pulverized (B) in a powder blender (dry blending).

In the above method ①, the compound (A) prepared in advance can be incorporated into the urethane prepolymer (B1), chain extender (B2) or terminator (B3) by dissolving or dispersing therein.

The compound (A) may be formed beforehand in the polyol (a2), which is one of the starting materials for preparing the urethane prepolymer (B1).

Among the methods mentioned above, the method ① is preferred, in which (A) is most preferably incorporated in advance into the urethane prepolymer (B1).

In producing the hot-melt resin composition of the present invention by the above-mentioned method ①, the water containing the dispersion stabilizer (D) is generally used in an amount of at least 50 parts by weight, preferably 100 to 1,000 parts by weight, per 100 parts by weight of the mixture comprising the urethane prepolymer (B1) containing a predetermined amount of the compound (A) and the chain extender (B2), as necessary together with the terminator (B3). When the amount of water is less than 50 parts by weight, the state of dispersion of said mixture becomes poor, rendering it difficult to obtain a resin powder with favorable particle size. When necessary, in order to depress a viscosity of the mixture, warming (e.g. to 40° C. to 100° C.) may be made or an organic solvent inert to isocyanates, for example an ester solvent, ketone solvent, chlorinated hydrocarbon solvent or aromatic solvent, may be added.

A speed of rotation of the high-speed dispersing mixer is generally at least 1,000 rpm, preferably 3,000 to 10,000 rpm.

In said method, (B2), as necessary together with (B3), may be added after dispersing (B1) in water or just before dispersing (B1). The latter is preferred, however, since, in this case, the reaction can proceed more uniformly.

The hot-melt resin composition of the present invention preferably has a melting initiation temperature of 70° C. to 180° C. Outside this range, an appropriate flowability level cannot be obtained, hence when the composition is used as an adhesive for interlining, a satisfactory bonding strength can hardly be obtained and, when it is used as a slush molding material, the smoothness and resin strength of molded sheets tend to be insufficient.

The difference between the melting initiation temperature and melting completion temperature of the hot-melt resin composition of the present invention is not more than 40° C., preferably not more than 30° C. When the difference between the melting initiation temperature and melting completion temperature is larger than 40° C., the thermal melting will not finish within a predetermined period of time and therefore the composition, when used as an adhesive for interlining, will fail to give a desired bonding strength and, when used as a slush molding material, will fail to provide molded sheets with desired smoothness.

When the content of compound (A) (hot-melt property improving agent) is, for example, 10% by weight, the hot-melt resin composition of the present invention shows a melt index at least 5 to 20 times that of the corresponding (A)-free composition, as determined according to JIS K 7210, method B. Said composition of the invention, when heated for instance at 130° C., shows a fusing time one third to one sixth or still shorter as compared with the corresponding (A)-free composition.

When the hot-melt resin composition of the present invention is to be used as an adhesive for interlining, it preferably has a melt index of 50 to 500 g/10 minutes as determined by JIS K 7210, method B (conditions: 160° C., 2.16 Kg). Outside this range, there is a tendency toward failure to attain an appropriate flowability and a satisfactory bonding strength.

When said composition is to be used as a slush molding material, it preferably has a melt index of 10 to 500 g/10 minutes as determined by JIS K 7210, method B (conditions: 200° C., 2.16 Kg). Outside this range, there is a tendency toward failure to attain an appropriate flowability and obtain molded sheets with satisfactory smoothness.

The hot-melt resin composition of the present invention may contain, as necessary, an isocyanate-reducible agent (C).

Said isocyanate-reproducible or regeneration agent (C) includes ① urethdione group-containing organic polyisocyanate derivatives (C1), ② reaction products (C2) from an organic polyisocyanate (c1) and a blocking agent (c2), and mixtures of these.

Said component (C), when heated at molding or for thermal adhesion, allows regeneration of isocyanate groups, which react with active hydrogen-containing groups [e.g. urethane groups, urea groups, terminal hydroxy groups of (B), etc.] in the thermoplastic polyurethane resin (B). Thus, (C) is a component serving as a crosslinking agent.

The urethdione group-containing organic polyisocyanate derivatives (C1) mentioned above in ① are compounds comprising at least three diisocyanate molecules bonded together via urethdione bonding, with the terminal isocyanate groups being blocked by a masking agent (C3). Thus, they have the following general formula (2):

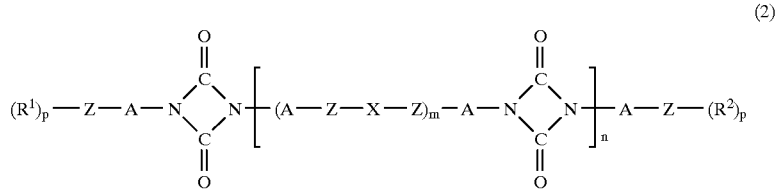

(wherein $R^1$ and $R^2$ each independently is an alkyl group containing 1 to 8 carbon atoms, A is a diisocyanate residue, Z is a urethane or urea group when p is 1 and, when p is 2, Z is a urea group, X is a dihydric alcohol or diamine residue containing 2 to 10 carbon atoms, p is 1 or 2, m is 0 or an integer of 1 to 60 and n is an integer of 1 to 60).

Referring to the above general formula (2), the monohydric alcohol containing 1 to 8 carbon atoms and constituting $R^1$ and $R^2$ includes methanol, ethanol, propanol, butanol, octanol and the like. As the corresponding monoamine, there may be mentioned butylamine, diethylamine, dibutylamine and the like. Among these, monohydric alcohols are preferred. $R^1$ and $R^2$ may be the same or different.

The dihydric alcohol containing 2 to 10 carbon atoms and constituting X includes ethylene glycol, 1,4-butanediol, 1,6-hexanediol, diethylene glycol and the like. The corresponding diamine includes ethylene diamine, butylenediamine, hexamethylenediamine, isophoronediamine and the like. Among these, dihydric alcohols are preferred.

As the organic diisocyanate constituting A, there may be mentioned those organic diisocyanates mentioned hereinabove as examples of (a1). Among these, aliphatic and alicyclic diisocyanates are preferred.

The integer n is generally 1 to 60, preferably 6 to 40. When n is above 60, the hot-melt properties of the hot-melt resin composition will be sacrificed.

Said urethdione group-containing organic polyisocyanate derivatives (C1) generally has a molecular weight of 500 to 10,000, preferably 1,000 to 7,000.

The method of producing said derivatives (C1) is not critical but the conventional methods mentioned below, for example, can be employed.

① A method comprising converting the organic diisocyanate to the corresponding urethdione group-containing polyisocyanate and masking the terminal isocyanate groups with the masking agent (C3).

② A method comprising mixing a stoichiometric excess of the organic diisocyanate with the masking agent (C3) in advance and carrying out the urethdione formation reaction and masking reaction simultaneously.

③ A method comprising mixing a stoichiometric excess of the organic diisocyanate with the glycol containing 2 to 10 carbon atoms and/or the diamine containing 2 to 10 carbon atoms in advance, carrying out the urethane and/or urea formation reaction simultaneously with the urethdione formation reaction, and masking the terminal isocyanate groups of the thus-obtained urethdione group-containing polyisocyanate with the masking agent (C3).

④ A method comprising mixing a stoichiometric excess of the organic diisocyanate with the glycol containing 2 to 10 carbon atoms and/or the diamine containing 2 to 10 carbon atoms, together with the masking agent (C3), in advance, and carrying out the urethane and/or urea formation reaction, the urethdione formation reaction and the masking reaction simultaneously.

Among these methods, methods ① and ③ are preferred from the industrial viewpoint.

The urethdione formation reaction is generally carried out at a temperature of 100° C. to 200° C., preferably 150° C. to 190° C . When the reaction temperature is 170° C., the reaction is generally carried out for 10 to 60 minutes, preferably 20 to 40 minutes.

In carrying out the urethdione formation reaction, a known catalyst may be used as necessary. As specific examples of said catalyst, there may be mentioned organometallic compounds [dibutyltin dilaurate, dioctyltin laurate, etc.]; amines [triethylamine, triethylenetriamine, diazabicycloundec ene, etc.]; and combinations of two or more of these. The level of addition of the catalyst is not critical but generally is 0.001 to 0.05 part by weight per 100 parts by weight of the urethdione group-containing polyisocyanate derivative (C1).

As (c1) mentioned above in ②, there may be mentioned at least one polyisocyanate selected from among those diisocyanates and modifications thereof (e.g. isocyanurate, biuret, carbodiimide and like modifications) mentioned hereinabove as examples of said (a1).

The number of isocyanate groups in (c1) is generally two or more, preferably 3 or 4.

Preferred as said (c1) are the isocyanurate modification of isophoronediisocyanate, the isocyanurate modification of hexamethylene diisocyanate and the biuret modification of hexamethylene diisocyanate.

The blocking agent (c2) includes oximes [acetoxime, butanone oxime, methyl ethyl ketone oxime, etc.]; lactams [γ-butyrolactam, ε-caprolactam, γ-valerolactam, etc.]; alcohols [methanol, ethanol, etc.,]; phenols [phenol, cresol, ethylphenol, xylenol, dipropylphenol, di-t-butylphenol, trimethylphenol, etc.]; active methylene-containing compounds [diethyl malonate, acetylacetone, ethyl acetoacetate, etc.] and the like.

Among these, lactams are preferred, and ε-caprolactam is most preferred.

Preferred as the isocyanate-reproducible or regeneration agent (C), which is used as necessary in the practice of the present invention, are those urethdione group-containing organic polyisocyanate derivatives (C1) which do not generate any volatile component upon heating of (C) for isocyanate group regeneration. Particularly preferred are urethdione group-containing polyisocyanate derivatives derived from alicyclic diisocyanates and aliphatic diisocyanates.

The isocyanate-regeneration agent (C) is generally used in an amount of 0 to 20 parts by weight, preferably 0 to 10 parts by weight, per 100 parts by weight of the sum total of (A) and (B). When the amount of (C) exceeds 20 parts by weight, the flexibility of molded sheets after slush molding will be reduced.

In cases where the isocyanate-regeneration agent (C) is used, the thermoplastic polyurethane resin (B) is preferably the one having terminal hydroxy groups resulting from the use of an alkanolamine as the terminator (B3).

Said component (C) may be admixed with a resin mixture comprising (A) and (B) by the powder blending technique or may be incorporated into one of (B1), (B2) and (B3) prior to preparation of (B). The latter method is preferred since (C) can be uniformly incorporated into the resin.

The resin powder comprising the hot-melt resin composition of the present invention, either as it is or in the form of an aqueous paste, can suitably be applied, as a hot-melt adhesive for interlining, to woven or nonwoven fabrics, for instance.

A hot-melt resin powder composition comprising said resin powder, a plasticizer (E), a pigment (F), an antiblocking agent (G) and a mold release agent (H) can suitably be used as a slush molding material.

Said plasticizer (E) includes phthalate esters [dibutyl phthalate, dioctyl phthalate, butyl benzyl phthalate, diisodecyl phthalate, etc.]; aliphatic dibasic acid esters [di-2-ethylhexyl adipate, di-2-ethylhexyl sebacate, etc.]; trimellitate esters [tri-2-ethylhexyl trimellitate, trioctyl trimellitate, etc.]; phosphate esters [tri-2-ethylhexyl phosphate, trioctyl phosphate, tricresyl phosphate, etc.]; fatty acid esters [butyl oleate etc.]; and mixtures of two or more of these.

Among these, preferred are phthalate esters and trimellitate esters and particularly preferred are diisodecyl phthalate, tri(2-ethylhexyl) trimellitate and triisodecyl trimellitate.

Said pigment (F) is not limited to any particular species but a known organic pigment and/or inorganic pigment can be used.

The organic pigment includes insoluble azo pigments, soluble azo pigments, copper phthalocyanine pigments, quinacridone pigments and the like. The inorganic pigment includes chromate salts, ferrocyanides, metal oxides, selenium sulfides, metal salts (sulfates, silicates, carbonates, phosphates, etc.), metal powders, carbon black and the like.

The antiblocking agent (G) is not limited to any particular species but a known inorganic or organic antiblocking agent may be used.

The inorganic antiblocking agent includes silica, talc, titanium oxide, calcium carbonate and the like. The organic antiblocking agent includes thermosetting resins (e.g. thermosetting polyurethane resins, guanamine resins, epoxy resins, etc.) with a particle size of 10 μm or less and thermoplastic resins [e.g. thermoplastic polyurethane resins, poly(meth)acrylate resins, etc.] with a particle size of 10 μm or less.

Among these, preferred are inorganic antiblocking agents and more preferred is silica.

Any known mold release agent may be used as said mold release agent (H). Said mold release agent includes, among others, fluorine-containing mold release agents (fluoroalkyl phosphates etc.), silicone-type mold release agents (dimethylpolysiloxane, amino-modified dimethylpolysiloxane, carboxyl-modified dimethylpolysiloxane, etc.), fatty acid ester mold release agents [alkanoic acid (11 to 24 of carbon atoms) alkenyl (6 to 24 of carbon atoms) esters etc.] and phosphate ester mold release agents (tributyl phosphate etc.).

Among these, preferred are fluorine-containing mold release agents and silicone-type mold release agents.

In the above-mentioned resin powder composition for slush molding, the proportions of (E), (F), (G) and (H) in the hot-melt resin composition in powder form are generally as follows: 5 to 20 parts by weight, preferably 7 to 15 parts by weight, of (E); 0.5 to 5 parts by weight, preferably 1 to 3 parts by weight, of (F); 0.5 to 3 parts by weight, preferably 0.7 to 2.5 parts by weight, of (G); and 0.5 to 3 parts by weight, preferably 0.7 to 2.5 parts by weight, of (H), per 100 parts by weight of said resin powder.

When the amount of (E) is below 5 parts by weight, the melt viscosity in the molding step becomes excessively high, giving defective moldings. When said amount exceeds 20 parts by weight, there arises the problem of bleeding out of (E) to the skin surface of moldings with the lapse of time.

When the amount of (F) is below 0.5 part by weight, the hiding power becomes insufficient. When said amount exceeds 5 parts by weight, the melt viscosity in the molding step becomes excessively high, giving defective moldings.

When the amount of (G) is below 0.5 part by weight, the angle of repose of said powder composition becomes excessively large. When said amount exceeds 3 parts by weight, the melt viscosity in the molding step becomes excessively high, giving defective moldings.

When the amount of (H) is below 0.5 part by weight, the release resistance becomes high. When said amount exceeds 3 parts by weight, there arises the problem of bleeding out of (H) to the skin surface of moldings with the lapse of time.

The method of preparing said resin powder composition for slush molding is not critical but includes the following methods.

①  A method comprising incorporating (E), (F) and (H), as necessary together with (C), into (B1) in the step of producing the hot-melt resin powder, and mixing the resin powder obtained with (G).

② A method comprising incorporating (E) and (F), as necessary together with (C), into (B1) in the step of producing the hot-melt resin powder, and mixing the resin powder obtained with (H) and (G).

③ A method comprising admixing (E), (F), (G) and (H) with the hot-melt resin powder comprising (A) and (B), as necessary further comprising (C).

④ A method comprising admixing a mixture of (E), (F) and (H) as prepared in advance with the hot-melt resin powder comprising (A) and (B), as necessary further comprising (C), and then admixing (G) with the resulting mixture.

Among these, the method ④ is particularly preferred by which resin powder compositions with good powder flowability can be obtained.

In the step of producing said resin powder composition, the temperature at which the resin powder and other powders are blended is generally not higher than 100° C., preferably not higher than 70° C., more preferably not higher than 50° C. At temperatures exceeding 100° C., powder particles coalesce with one another, hence the composition with a desired particle size cannot be obtained.

The mixing time is not critical but generally is 1 to 20 minutes, preferably 2 to 10 minutes.

The apparatus to be used in producing said resin powder composition is not critical but a known powder mixing apparatus can be used.

Specific examples of said powder mixing apparatus are high-speed shearing mixers ["Henschel mixer" (product of Mitsui Kozan), "High-speed Mixer" (product of Fukae Kogyo), etc.], low-speed mixers ["Nauta Mixer" (product of Hosokawa Micron) etc.] and the like.

The angle of repose of said resin powder composition for slush molding is generally not greater than 33°, preferably not greater than 30°. When the angle of repose is greater than 33°, the powder cannot enter mold details such as undercut portions, with the result that pinholes are formed on the surface of moldings.

The spatula angle is generally not greater than 50°, preferably not greater than 45°. When the spatula angle is greater than 50°, the thickness of moldings becomes ununiform.

Said angle of repose and spatula angle are measured by the method described by R. L. Carr in Chem. Eng., vol. 72, Jan. 18, p. 163 (1965) and ibid., Feb. 1, p. 69 (1965).

The angle of repose and spatula angle can be measured using the apparatus "Powder Tester" (product of Hosokawa Micron), for instance.

The hot-melt resin composition of the present invention, when used in the form of a powder or paste, generally has an average particle size of 10 to 500 $\mu$m, preferably 30 to 200 $\mu$m. When the average particle size is smaller than 10 $\mu$m, dust is generated in large amounts, contaminating the working environment. When it is greater than 500 $\mu$m and when the composition is used as an adhesive for interlining, the dots on the interlining become excessively large and, upon adhesion to a face cloth, the adhesive may ooze out through the interlining or face cloth, impairing the appearance or feeling of products and, in the case of a slush molding material, the smoothness of molded sheets may readily be impaired.

The average particle size mentioned above can be measured using "Micro Electromagnetic Vibration Sieve model M-2" (product of Tsutsui Rikagaku Kikai), for instance.

The hot-melt resin composition of the present invention may further contain as necessary one or more of known additives (weathering stabilizers, lubricants, coupling agents, heat stabilizers, flame retardants, etc.).

BEST MODE FOR CARRYING OUT THE INVENTION

The following examples are further illustrative of the present invention but are by no means limitative of the scope of the present invention. In the following description, "part (s)" means "part(s) by weight" and "%" means "% by weight".

[Production of compound (A)]

PRODUCTION EXAMPLE 1

A four-necked flask equipped with a stirrer and a thermometer was charged with 213 parts of stearylamine, 593 parts of toluene and 254 parts of isopropyl alcohol. While maintaining the mixture at 40° C., 150 parts of biuret-modified HDI trimer ("Tolonate HDB", product of Rhone Poulenc) was added dropwise over 3 hours to thereby allow the reaction to proceed. After completion of the dropping, the toluene and excess isopropyl alcohol were removed at 40° C. to 130° C. under reduced pressure. The reaction product had a free isocyanate content of not more than 0.1%. The contents were taken out of the flask, cooled, and ground using a Henschel mixer. The product thus obtained is designated as (A-1). This product (A-1) had a melting initiation temperature of 160° C. and a melting completion temperature of 165° C.

PRODUCTION EXAMPLE 2

A four-necked flask equipped with a stirrer and a thermometer was charged with 521 parts of distearylamine, 1,333 parts of toluene and 571 parts of isopropyl alcohol. While maintaining the mixture at 40° C., 295 parts of stearyl isocyanate was added dropwise over 3 hours to thereby allow the reaction to proceed. After completion of the dropping, the toluene and excess isopropyl alcohol were removed at 40° C. to 130° C. under reduced pressure. The reaction product had a free isocyanate content of not more than 0.1%. The contents were taken out of the flask, cooled, and ground using a Henschel mixer. The product thus obtained is designated as (A-2). This product (A-2) had a melting initiation temperature of 68° C. and a melting completion temperature of 72° C.

PRODUCTION EXAMPLE 3

A four-necked flask equipped with a stirrer and a thermometer was charged with 216 parts of benzyl alcohol and 222 parts of IPDI and the reaction was carried out at 130° C. for 8 hours. The reaction product had a free isocyanate content of not more than 0.1%. The product thus obtained is designated as (A-3). This product (A-3) had a melting initiation temperature of 15° C. and a melting completion temperature of 18° C.

PRODUCTION EXAMPLE 4

A four-necked flask equipped with a stirrer and a thermometer was charged with 210 parts of diethanolamine and 1,000 parts of acetone. While maintaining the mixture at 40° C., 222 parts of IPDI was added dropwise over 3 hours to thereby allow the reaction to proceed. After completion of the dropping, the acetone was removed at 40° C. to 100° C. under reduced pressure. The reaction product had a free isocyanate content of not more than 0.1%. The contents were taken out of the flask, cooled, and ground using a Henschel mixer. The product thus obtained is designated as (A-4). This product (A-4) had a melting initiation temperature of 120° C. and a melting completion temperature of 125° C.

[Production of colorant]

PRODUCTION EXAMPLE 5

A four-necked flask equipped with a stirrer and a thermometer was charged with 15 parts of diisodecylphthalate, 0.5 part of a light stabilizer (DIC-TBS, product of Dainippon Ink and Chemicals), 2 parts of titanium dioxide ("Tipaque R-820", product of Ishihara Sangyo) and 3 parts of dimethylpolysiloxane ("SH-200", product of Shin-Etsu Chemical) and the whole was stirred until it became homogeneous. The mixture thus obtained is designated as [colorant 1].

EXAMPLE 1

A four-necked flask equipped with a stirrer and a thermometer was charged with 2,078 parts of polybutylene adipate diol with a hydroxyl value of 54 and dehydration was effected by heating at 110° C. and under reduced pressure (3 mm Hg) for 1 hour. Then, 71.3 parts of ethylene glycol and 954 parts of IPDI were added and the reaction was carried out at 120° C. for 8 hours to give an isocyanate-terminated urethane prepolymer. To this prepolymer was then added 776 parts of (A-1) prepared in Production Example 1. Said prepolymer mixture had a free isocyanate content of 4.65%. To 50 parts of this (A-1)-containing prepolymer were added 6.60 parts of the reaction product (ketimine) from isophoronediamine (IPDA) and methyl ethyl ketone (MEK) and 1.02 parts of di-n-butylamine. After stirring to attain homogeneity, 250 parts of a 1% aqueous solution of polyvinyl alcohol was added and the whole was mixed up at 6,000 rpm for 1 minute using an Ultra disperser (product of Yamato Kagaku). Then, 1 part of an antiblocking agent ("Silicia 435", product of Fuji Silicia Chemical) was added and the mixture was stirred for further 3 hours to drive the reaction to completion. Filtration and drying gave a resin powder (F1). This resin powder had an average particle size of 100 $\mu$m, a softening temperature of 85° C. and a melt index (160° C., 2.16 Kg) of 360 g/10 minutes.

EXAMPLE 2

A four-necked flask equipped with a stirrer and a thermometer was charged with 2,078 parts of polybutylene adipate diol with a hydroxyl value of 54 and dehydration was effected by heating at 110° C. and under reduced pressure (3 mm Hg) for 1 hour. Then, 71.3 parts of ethylene glycol and 954 parts of IPDI were added and the reaction was carried out at 120° C. for 8 hours to give an isocyanate-terminated urethane prepolymer. To this prepolymer was then added 345 parts of (A-2) prepared in Production Example 2. Said prepolymer mixture had a free isocyanate content of 5.24%. To 50 parts of this (A-2)-containing prepolymer were added 7.43 parts of the reaction product (ketimine) from IPDA and MEK and 1.15 parts of di-n-butylamine. After stirring to attain homogeneity, 250 parts of a 1% aqueous solution of polyvinyl alcohol was added and the whole was mixed up at 6,000 rpm for 1 minute using an Ultra disperser (product of Yamato Kagaku). Then, 1 part of an antiblocking agent ("Silicia 435", product of Fuji Silicia Chemical) was added and the mixture was further stirred for 3 hours to drive the reaction to completion. Filtration and drying gave a resin powder (F2). This resin powder had an average particle size of 90 $\mu$m, a softening temperature of 100° C. and a melt index (160° C., 2.16 Kg) of 210 g/10 minutes.

EXAMPLE 3

A four-necked flask equipped with a stirrer and a thermometer was charged with 2,078 parts of polybutylene adipate diol with a hydroxyl value of 54 and dehydration was effected by heating at 110° C. and under reduced pressure (3 mm Hg) for 1 hour. Then, 71.3 parts of ethylene glycol and 954 parts of IPDI were added and the reaction was carried out at 120° C. for 8 hours to give an isocyanate-terminated urethane prepolymer. To this prepolymer was then added 163 parts of (A-3) prepared in Production Example 3. Said prepolymer mixture had a free isocyanate content of 5.53%. To 50 parts of this (A-3)-containing prepolymer were added 7.84 parts of the reaction product (ketimine) from IPDA and MEK and 1.21 parts of di-n-butylamine. After stirring to attain homogeneity, 250 parts of a 1% aqueous solution of polyvinyl alcohol was added and the whole was mixed up at 6,000 rpm for 1 minute using an Ultra disperser (product of Yamato Kagaku). Then, 1 part of an antiblocking agent ("Silicia 435", product of Fuji Silicia Chemical) was added and the mixture was further stirred for 3 hours to drive the reaction to completion. Filtration and drying gave a resin powder (F3). This resin powder had an average particle size of 80 $\mu$m, a softening temperature of 110° C. and a melt index (160° C., 2.16 Kg) of 120 g/10 minutes.

EXAMPLE 4

To 50 parts of the (A-2)-containing prepolymer obtained in Example 2 was added 250 parts of a 1% aqueous solution of polyvinyl alcohol, and the mixture was stirred at 6,000 rpm for 1 minute using an Ultra disperser (product of Yamato Kagaku). Then, a mixture of 4.54 parts of IPDA and 1.15 parts of di-n-butylamine as prepared beforehand was added and the whole was stirred further for 10 seconds to give a homogeneous mixture. Then, 1 part of an antiblocking agent ("Silicia 435", product of Fuji Silicia Chemical) was added and the mixture was further stirred for 3 hours to drive the reaction to completion. Filtration and drying gave a resin powder (F4). This resin powder had an average particle size of 130 $\mu$m, a softening temperature of 100° C. and a melt index (160° C., 2.16 Kg) of 240 g/10 minutes.

EXAMPLE 5

A four-necked flask equipped with a stirrer and a thermometer was charged with 2,078 parts of polyethylene adipate diol with a hydroxyl value of 54 and dehydration was effected by heating at 110° C. and under reduced pressure (3 mm Hg) for 1 hour. Then, 1,562 parts of dicyclohexylmethanediisocyanate was added and the reaction was carried out at 110° C. for 3 hours to give an isocyanate-terminated urethane prepolymer. Said prepolymer had a free isocyanate content of 11.45%. A kneader-type polymerization reactor equipped with a nitrogen inlet device was then charged with 3,639 parts of said prepolymer, 276 parts of ethylene glycol, 74 parts of n-butyl alcohol, 0.2 part of dibutyltin dilaurate and 443 parts of (A-2) obtained in Production Example 2, and the reaction was carried out at 120° C. for 2 hours. After the reaction, the free isocyanate content was not more than 0.1%. Said urethane resin was then taken out and ground using a freeze grinder to give a resin powder (F5). This resin powder had an average particle size of 250 $\mu$m, a softening temperature of 130° C. and a melt index (160° C., 2.16 Kg) of 120 g/10 minutes.

EXAMPLE 6

A four-necked flask equipped with a stirrer and a thermometer was charged with 2,078 parts of polybutylene adipate diol with a hydroxyl value of 54 and dehydration was effected by heating at 110° C. and under reduced pressure (3 mm Hg) for 1 hour. Then, 24.9 parts of ethylene glycol and 778 parts of IPDI were added and the reaction was carried out at 120° C. for 8 hours to give an isocyanate-terminated urethane prepolymer. To this prepolymer was then added 320 parts of (A-4) prepared in Production Example 4. Said prepolymer mixture had a free isocyanate content of 3.68%. To 50 parts of this (A-4)-containing prepolymer were added 5.62 parts of the reaction product (ketimine) from IPDA and MEK and 0.35 part of diethanolamine. After stirring to attain homogeneity, 250 parts of a 1% aqueous solution of polyvinyl alcohol was added and the whole was mixed up at 6,000 rpm for 1 minute using an Ultra disperser (product of Yamato Kagaku), followed by 3 hours of stirring to drive the reaction to completion. Filtration and drying gave a resin powder. This resin powder had an average particle size of 150 $\mu$m, a softening temperature of 130° C. and a melt index (200° C., 2.16 Kg) of 90 g/10 minutes.

Then, a Henschel mixer (product of Mitsui Kozan) was charged with 100 parts of said resin powder, 18 parts of [colorant 1] and 2.5 parts of a blocked polyisocyanate ("B 1530", product of Daicel Huels) ground beforehand in a ball mill, and mixing was carried out at 25° C. and at 300 rpm for 10 minutes, then 1 part of silica ("Silicia 435", product of Fuji Silicia Chemical) wad added and mixing was further carried out at 3,000 rpm for 1 minute to give a colored resin powder (F7).

EXAMPLE 7

A four-necked flask equipped with a stirrer and a thermometer was charged with 2,078 parts of polycarbonate diol ("Placcel CD 220", product of Daicel Chemical Industries) with a hydroxyl value of 54 and dehydration was effected by heating at 110° C. and under reduced pressure (3 mm Hg) for 1 hour. Then, 24.9 parts of ethylene glycol and 778 parts of IPDI were added and the reaction was carried out at 120° C. for 8 hours to give an isocyanate-terminated urethane prepolymer. To this prepolymer was then added 320 parts of (A-4) prepared in Production Example 4. Said prepolymer mixture had a free isocyanate content of 3.68%. To 50 parts of this (A-4)-containing prepolymer were added 5.62 parts of the reaction product (ketimine) from IPDA and MEK and 0.35 part of diethanolamine. After stirring to attain homogeneity, 250 parts of a 1% aqueous solution of polyvinyl alcohol was added and the whole was mixed up at 6,000 rpm for 1 minute using an Ultra disperser (product of Yamato Kagaku), followed by 3 hours of stirring to drive the reaction to completion. Filtration and drying gave a resin powder. This resin powder had an average particle size of 150 $\mu$m, a softening temperature of 130° C. and a melt index (200° C. 2.16 Kg) of 90 g/10 minutes.

Then, a Henschel mixer (product of Mitsui Kozan) was charged with 100 parts of said resin powder, 18 parts of [colorant 1] and 8.5 parts of a urethdione group-containing polyisocyanate derivative ("BF 1540", product of Huels Japan) ground beforehand in a ball mill, and mixing was carried out at 25° C. and at 300 rpm for 10 minutes, then 1 part of silica ("Silicia 435", product of Fuji Silicia Chemical) was added and mixing was further carried out at 3,000 rpm for 1 minute to give a colored resin powder (F8).

COMPARATIVE EXAMPLE 1

A four-necked flask equipped with a stirrer and a thermometer was charged with 2,078 parts of polybutylene adipate diol with a hydroxyl value of 54 and dehydration was effected by heating at 110° C. and under reduced pressure (3 mm Hg) for 1 hour. Then, 71.3 parts of ethylene glycol and 954 parts of IPDI were added and the reaction was carried out at 120° C. for 8 hours to give an isocyanate-terminated urethane prepolymer. Said prepolymer had a free isocyanate content of 5.82%. To 50 parts of this prepolymer was added 8.25 parts of the reaction product (ketimine) from IPDA and MEK and 1.28 parts of di-n-butylamine. After stirring to attain homogeneity, 250 parts of a 1% aqueous solution of polyvinyl alcohol was added and the whole was mixed up at 6,000 rpm for 1 minute using an Ultra disperser (product of Yamato Kagaku), then 1 part of an antiblocking agent ("Silicia 435", product of Fuji Silicia Chemical) was added and stirring was further carried out for 3 hours to drive the reaction to completion. Filtration and drying gave a resin powder (F6) for comparison. This resin powder had an average particle size of 75 $\mu$m, a softening temperature of 116° C. and a melt index (160° C., 2.16 Kg) of 38 g/10 minutes.

COMPARATIVE EXAMPLE 2

A four-necked flask equipped with a stirrer and a thermometer was charged with 2,078 parts of polybutylene adipate diol with a hydroxyl value of 54 and dehydration was effected by heating at 110° C. and under reduced pressure (3 mm Hg) for 1 hour. Then, 24.9 parts of ethylene glycol and 778 parts of IPDI were added and the reaction was carried out at 120° C. for 8 hours to give an isocyanate-terminated urethane prepolymer. Said prepolymer had a free isocyanate content of 4.09%. To 50 parts of this prepolymer were added 6.24 parts of the reaction product (ketimine) from IPDA and MEK and 0.39 part of diethanolamine. After stirring to attain homogeneity, 250 parts of a 1% aqueous solution of polyvinyl alcohol was added and the whole was mixed up at 6,000 rpm for 1 minute using an Ultra disperser (product of Yamato Kagaku), followed by further 3 hours of stirring to drive the reaction to completion. Filtration and drying gave a resin powder for comparison. This resin powder had an average particle size of 130 μm, a softening temperature of 150° C. and a melt index (200° C., 2.16 Kg) of 8 g/10 minutes.

Then, a Henschel mixer (product of Mitsui Kozan) was charged with 100 parts of said resin powder, 18 parts of [colorant 1] and 2.5 parts of a blocked polyisocyanate derivative ("B 1530", product of Huels Japan) ground beforehand in a ball mill, and mixing was carried out at 25° C. and at 300 rpm for 10 minutes, then 1 part of silica ("Silicia 435", product of Fuji Silicia Chemical) was added and mixing was further carried out at 3,000 rpm for 1 minute to give a colored resin powder (F9).

PERFORMANCE TEST EXAMPLE 1

The resin powders (F1) to (F6) were respectively applied by powder coating to polyester/cotton (65/35) blended yarn broad cloths. The coating weight was 20 g/m². The coated cloths were heated for fixation at 150° C. for 1 minute to give adhesive interlinings. The adhesive interlinings obtained were each bonded to a cotton knit fabric (face cloth) using an adhesive interlining cloth press (product of Kobe Denki) under conditions of 150° C.×load 300 g/cm²× 15 seconds. Each bonded cloth thus obtained was tested for performance characteristics by the methods mentioned below. The results are shown in Table 1.

Bonding strength: The 180° peel strength was measured at a rate of pulling of 200 mm/minute using "Autograph model P-100" (product of Shimadzu Corp.).

Resistance to laundering and resistance to dry cleaning: Evaluation was made according to JIS L 1089.

Feel: The flexibility of the interlining after adhesion was evaluated by feeling it with the hand.

TABLE 1

| | Example | | | | | Comparative Example 1 |
|---|---|---|---|---|---|---|
| | 1 | 2 | 3 | 4 | 5 | |
| Resin powder | F1 | F2 | F3 | F4 | F5 | F6 |
| Feel | Good | Good | Good | Good | Good | Good |
| Peel strength at 180° (Kg/inch) | 1.8 | 1.5 | 1.1 | 1.5 | 1.2 | 0.3 |
| After dry cleaning (Kg/inch) | 1.2 | 1.4 | 1.1 | 1.4 | 1.0 | 0.2 |
| After laundering (Kg/inch) | 1.3 | 1.3 | 1.1 | 13 | 1.2 | 0.1 |

PERFORMANCE TEST EXAMPLE 2

The colored resin powders (F7) to (F9) and a commercial PVC powder for slush molding ("S 130", product of Sumitomo Chemical) designated as Comparative Example 3 were each contacted with a mold heated at 220° C. for 10 seconds, the powder portion remaining unfused was removed, the fused portion was allowed to stand at room temperature for 1 minute and then cooled with water to give a molded sheet. The thus-obtained sheets were subjected to performance testing by the methods mentioned below. The results are shown in Table 2.

Sheet smoothness: The both sides of each sheet were evaluated by the eye for their smoothness.

Tensile strength and elongation (25° C. and −35° C.): Measurements were made according to JIS K 6301.

Haze after fogging test: A 50×50 mm sample was placed in a glass vessel having a ground mouth. After covering the vessel with a glass plate, the whole was immersed in an oil bath maintained at 80° C. After 24 hours, the haze of the cover glass plate was measured by the method of JIS K 6717.

TABLE 2

| | Example 6 | Example 7 | Comparative Example 2 | Comparative Example 3 |
|---|---|---|---|---|
| Resin powder | F7 | F8 | F9 | PVC |
| Sheet smoothness | Smooth | Smooth | Uneven | Smooth |
| Tensile strength (Kg/cm²) | 110 | 110 | 35 | 130 |
| Elongation (%) (25° C.) | 400 | 400 | 100 | 250 |
| Elongation (%) (−35° C.) | 250 | 250 | 100 | 70 |
| Haze after fogging test (%) | 3 | 0 | 3 | 7 |

PERFORMANCE TEST EXAMPLE 3

The colored resin powders (F7) to (F9) and a commercial PVC powder for slush molding ("S 130", product of Sumitomo Chemical) designated as Comparative Example 3 were each contacted with a mold heated at 240° C. and, after thermal fusion, the melts were cooled with water to give molded sheets. A urethane foam-forming composition was placed on the thus-obtained molded sheets and allowed to foam and adhere to said moldings. Urethane foam moldings respectively having a surface layer of (F7), (F8), (F9) or PVC were thus obtained. These moldings were tested for performance characteristics by the methods mentioned below. The results are shown in Table 3.

Heat resistant elongation: The moldings were maintained in a following wind drier at 120° C. for 500 hours and then deprived of the urethane foam layer. Each sheet was measured for elongation according to JIS K 6301.

Light resistant elongation: Each molding was treated in a carbon arc fadeometer maintained at a black panel temperature of 83° C. for 400 hours, then deprived of the urethane foam and measured for elongation according to JIS K 6301.

Light resistance: After 400 hours of treatment in a carbon arc fadeometer maintained at a black panel temperature of 83° C., the surface appearance of each molding was evaluated by the eye.

TABLE 3

| | Example 6 | Example 7 | Comparative Example 2 | Comparative Example 3 |
|---|---|---|---|---|
| Resin powder | F7 | F8 | F9 | PVC |
| Heat resistant elongation (%) | 400 | 400 | 100 | 50 |
| Light resistant elongation (%) | 400 | 400 | 100 | 25 |
| Light resistance (appearance) | No change | No change | No change | Blackening |

INDUSTRIAL APPLICABILITY

The hot-melt resin composition comprising the hot-melting property improving agent of the present invention has the following effects:

(1) The hot-melting properties are very good (sharp);

(2) The hot-melt resin composition can be easily prepared in a powder or paste form by selecting the preparation method appropriately.

(3) When used as an adhesive for interlining, said composition provides such high levels of bonding strength, feel, resistance to dry cleaning and resistance to laundering that the conventional polyamide-, polyester-, polyethylene-, polyvinyl acetate- or plasticized polyvinyl chloride-based compositions or compositions comprising a polyurethane alone have so far failed to attain;

(4) When used as a slush molding material, said composition shows such high levels of light resistance, resin strength, and antifogging and other properties that the conventional plasticized polyvinyl chloride compositions have failed to attain;

(5) Soft feel can be obtained without using a plasticizer in large amounts and troubles such as plasticizer migration are not encountered even after a long period of use.

Owing to the above effects, the powder or paste comprising the hot-melt resin composition of the present invention is very useful as an adhesive for interlining to be used in the production of apparels or various industrial materials and as a slush molding material for the production of automotive upholstery.

We claim:

1. A hot-melt resin composition which comprises 1 to 30% by weight of a compound (A) represented by the general formula (1)

$$Q\text{-}(X\text{-}A)n \tag{1}$$

(wherein X is a urethane or urea group, Q is a group with a valence of n, A is a univalent group, one of Q and A being an organic isocyanate residue and the other being an amine or alcohol residue, and n is an integer of 1 to 3) and 70 to 99% by weight of a thermoplastic polyurethane resin (B), said composition being in powder form with an average particle size of 10 to 500μ.

2. The hot-melt resin composition according to claim 1, wherein the component (A) is at least one member selected from the group consisting of the product of reaction of an organic monoisocyanate with an equivalent amount of a monohydric alcohol and/or monoamine, the product of reaction of an organic monoisocyanate with an equivalent amount of a di- or trihydric alcohol and/or di- or triamine and the product of reaction of a bi- or trifunctional organic polyisocyanate with an equivalent amount of a monohydric alcohol and/or monoamine.

3. The hot-melt resin composition according to claim 1, wherein the component (A) has a number average molecular weight of 200 to 2,000.

4. The hot-melt resin composition according to claim 1, wherein the component (B) is a thermoplastic polyurethane resin produced by reacting at least one organic polyisocyanate (a1) selected from the group consisting of aromatic polyisocyanates, aliphatic polyisocyanates and alicyclic polyisocyanates with at least one high-molecular weight polyol (a2) having a number average molecular weight of 500 to 5,000 and selected from the group consisting of polyether polyols, polyester polyols, polysiloxane polyols, polybutadiene polyols, acrylate polyols and polymer polyols, as necessary together with a low-molecular weight compound having active hydrogen atoms.

5. The hot-melt resin composition according to claim 1, wherein the component (B) has a number average molecular weight of 5,000 to 80,000.

6. The hot-melt resin composition according to claim 1, wherein the thermal melting temperature is within the range of 70° C. to 180° C.

7. The hot-melt resin composition according to claim 1, wherein the difference between the melting initiation temperature and melting completion temperature is not more than 40° C.

8. The hot-melt resin composition according to claim 1, wherein the melt index (160° C., 2.16 kg) is 50 to 500 g/10 minutes.

9. The hot-melt resin composition according to claim 1, wherein the melt index (200° C., 2.16 kg) is 10 to 500 g/10 minutes.

10. A hot-melt resin composition which comprises 1 to 30% by weight of a compound (A) represented by the general formula (1)

$$Q\text{-}(X\text{-}A)n \tag{1}$$

(wherein X is a urethane or urea group, Q is a group with a valence of n, A is a univalent group, one of Q and A being an organic isocyanate residue and the other being an amine or alcohol residue, and n is an integer of 1 to 3), 70 to 99% by weight of a thermoplastic polyurethane resin (B), and an isocyanate-reproducible agent (C) in an amount not exceeding 20 parts by weight per 100 parts by weight of the sum total of (A) and (B).

11. The hot-melt resin composition according to claim 8, wherein the component (C) is a urethdione group-containing organic polyisocyanate derivative (C1).

12. The hot-melt resin composition according to claim 11, wherein the component (C1) is a compound of the general formula (2)

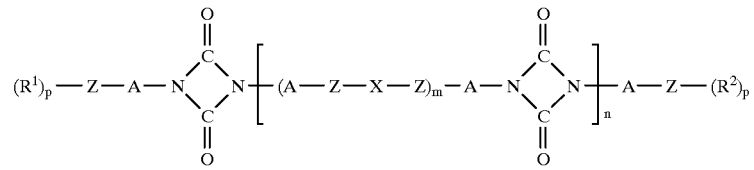

wherein $R^1$ and $R^2$ each independently is an alkyl group containing 1 to 8 carbon atoms, A is an organic diisocyanate residue, Z is a urethane or urea group when p is 1 and, when p is 2, z is a urea group, X is a dihydric alcohol or diamine residue containing 2 to 10 carbon atoms, p is 1 or 2, m is 0 or integer of 1 to 60 and n is an integer of 1 to 60.

13. The hot-melt resin composition according to claim 12, wherein the component (C1) has a number average molecular weight of 500 to 10,000.

14. A hot-melting property improving agent which is a compound of the general formula (1)

$$Q\text{-}(X\text{-}A)n \qquad (1)$$

(wherein X is a urethane or urea group, Q is a group with a valence of n, A is a univalent group, one of Q and A being an organic isocyanate residue and the other being an amine or alcohol residue, and n is an integer of 1 to 3; with the proviso that (i) Q is a residue of a biuret-modified or isocyanurate-modified diisocyanate and n is 2, or (ii) A is a residue of a monoisocyanate and Q is a residue of an amine, said compound having a number average molecular weight of 200 to 2,000 and a thermal melting initiation temperature of 10° C. to 180° C., and the difference between the melting initiation temperature and melting completion temperature being not greater than 10° C.

15. A method of improving the hot-melting property of a thermoplastic polyurethane resin which comprises incorporating the hot-melting property improving agent of claim 19 into said thermoplastic polyurethane resin.

16. The hot-melt resin composition according to claim 10, wherein said isocyanate-reproducible agent (C) is selected from the group consisting of urethdione group-containing organic polyisocyanate derivatives, reaction products from an organic polyisocyanate and a blocking agent, and mixtures thereof.

17. The hot-melting property improving agent according to claim 14, wherein the biuret-modified or isocyanurate-modified diisocyanate is a biuret-modified aliphatic diisocyanate or an isocyanurate-modified alicyclic diisocyanate.

18. The hot-melt composition according to claim 1, obtained by reacting an isocyanate-terminated urethane prepolymer (B1) containing said compound (A) with or without an isocyanate-reproducible agent (C) with a chain extender (B2) or a mixture of (B2) and a terminator (B3) in the presence of water and a dispersion stabilizer (D), and drying the resulting aqueous dispersion.

19. The hot-melt composition according to claim 18, obtained by dispersing a premix comprising said compound (A) with or without said agent (C) and a ketimine of a diamine having two primary amino groups into water containing said dispersion stabilizer (D) to thereby attain chain extension.

20. A hot-melt resin composition, which comprises 1 to 30% by weight of the hot-melting property improving agent of claim 14, and 70 to 99% by weight of a thermoplastic polyurethane resin.

\* \* \* \* \*